June 4, 1946.  W. OWEN  2,401,582
MANUFACTURING OF CELLULATED BODIES
Filed April 30, 1943  2 Sheets-Sheet 1
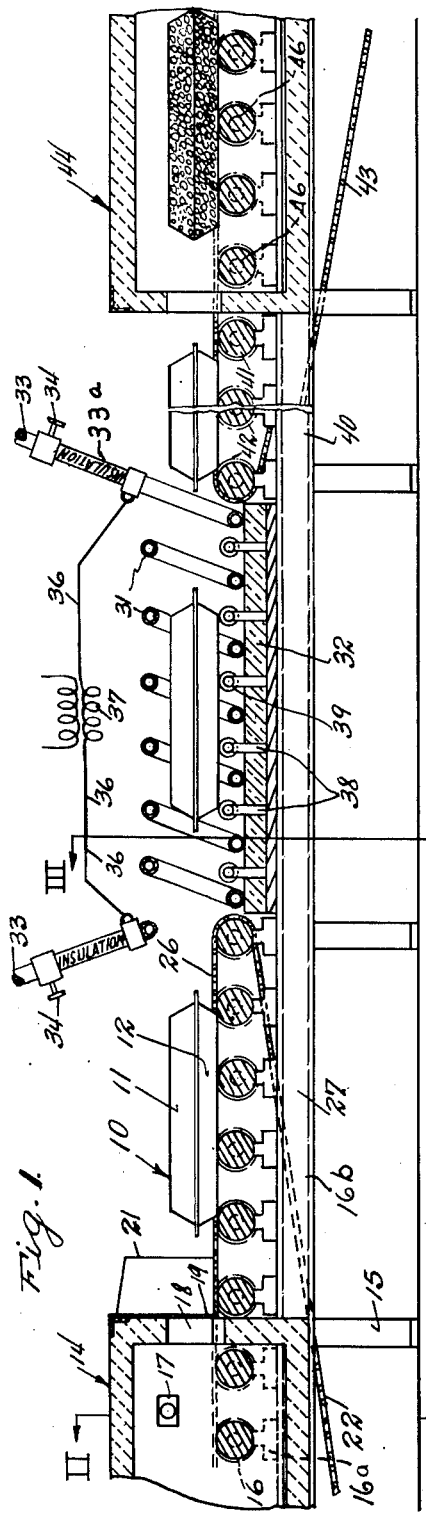
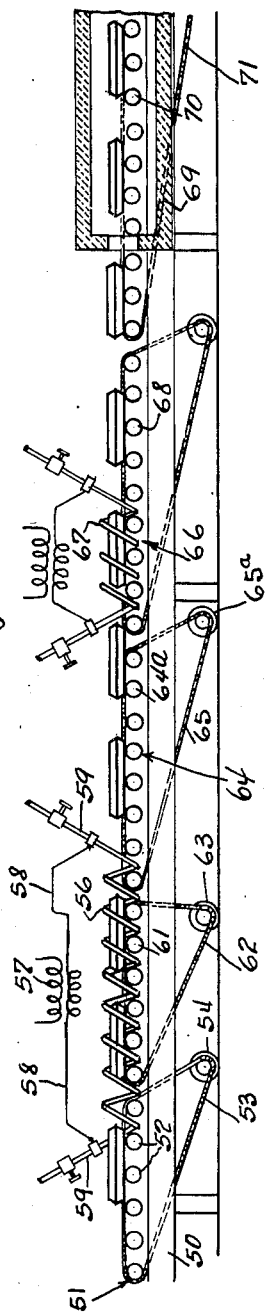
Inventor
WILLIAM OWEN
By Olen E. Bee
Attorney June 4, 1946.   W. OWEN   2,401,582
MANUFACTURING OF CELLULATED BODIES
Filed April 30, 1943   2 Sheets-Sheet 2

Inventor
WILLIAM OWEN
By Olen E. Bee
Attorney

Patented June 4, 1946

2,401,582

UNITED STATES PATENT OFFICE 2,401,582

MANUFACTURING OF CELLULATED BODIES

William Owen, Pittsburgh, Pa., assignor to Pittsburgh Plate Glass Company, Allegheny County, Pa., a corporation of Pennsylvania Application April 30, 1943, Serial No. 485,107

2 Claims. (Cl. 49—85)

The present invention relates to the preparation of cellular insulative materials and it has particular relation to the preparation of an insulative material by the sintering and bloating of a mixture of a finely pulverized glass and a pulverulent gassing agent reactive at or near the temperature of sintering to liberate gases that become entrapped in the sintered material.

One object of the invention is to provide improved means for releasing blocks of cellulated or bloated glass from the molds in which they are formed.

It has heretofore been proposed to prepare an insulative material, which is non-inflammable and resistant to moisture and chemical action, by heating together a mixture of finely pulverized glass and a gassing agent, such as calcium carbonate or carbon black in suitable molds to the temperature of sintering of the glass. When such mixture is so heated the particles of glass become partially sintered together to form a coherent plastic body and the gassing agent is decomposed or reacted at a temperature near or slightly above the sintering temperature so that the gases are entrapped as bubbles in the sintered mass. A bloated block or body having several times the volume of the original material is obtained, and has the inherent low heat conductivity of a highly cellular body as well as the resistance to moisture and other agencies of deterioration characteristic of glass. One difficulty encountered in the process has involved the provision of molds suitable for the purpose. These molds must be of simple and inexpensive construction and of high resistance to heat and corrosion by hot glass and furnace gases.

The removal of the cellular blocks from the molds is also a considerable problem, because most materials available for the molds have higher coefficients of thermal contraction than the glass blocks during cooling operations and therefore the molds tend to grip the blocks, thus preventing their removal.

In accordance with the provisions of the present invention it is proposed to provide very simple molds of a material, such as nickel chromium steel having high resistance to heat and chemical action, but having a considerable degree of electrical conductivity and then to subject the molds containing the cellulated or bloated glass blocks to a cycle involving first subjecting them to a cooling operation, in order to assure solidification of at least the outer crust of the cellular mass and subsequently subjecting the molds and their contents to a brief reheating operation by bringing them into a high frequency field, thus expanding the molds very quickly without substantially expanding the less heat conductive bodies contained in them. The blocks or bodies are thus released from the mold surface and can be quickly and easily removed from the molds, permitting the latter to be returned for refilling and permitting the blocks separated from the molds to be conducted through a suitable annealing lehr.

For a better understanding of the invention reference may now be had to the accompanying drawings in which like numerals refer to like parts throughout.

In the drawings

Fig. 1 is a fragmentary sectional view through a system designed for use in practicing the invention;

Fig. 5 is a fragmentary sectional view of a second system illustrating the invention and constituting a modification of that shown in Fig. 1.

Figure 2:
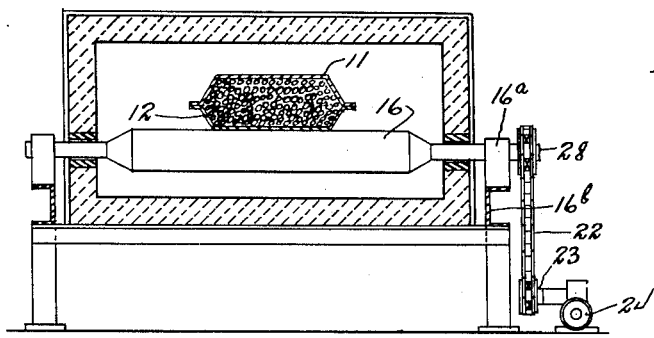
Fig. 2 is a sectional view taken upon the line II—II of Fig. 1.

In a system embodying the principles of the invention, such as that shown in Fig. 1 molds 10 are provided. These include superposed upper and lower halves 11 and 12, each of which preferably is of frustopyramidal or bread-pan like cross section. These halves are formed of a thermally refractory and electrically conductive metal, such as chrome-nickel steel and each half is best formed of a single piece of metal, the side walls of which are conductively joined to the bottom and joined to each other at the corners so as to obtain maximum and uniform electrical conductivity. As shown they constitute a single sheet formed to shape. Preferably the molds are also of fairly heavy gage sheet material, e. g., $\frac{1}{16}$ to $\frac{1}{64}$ inch in thickness.

The molds are preliminarily lined with a parting material designed to prevent adhesion between the mold surfaces and the glass. For this purpose, a slurry of hydrated bauxite or hydrated ferrous oxide may be employed, though of course other materials are also contemplated. The coated molds are dried and are then charged with a mixture of glass crushed for example to pass a screen of about 100 to 200 mesh, together with a small amount, e. g., 1½ percent of a pulverulent gassing agent, such as precipitated calcium carbonate or carbon black which at the temperature of sintering of the glass and slightly above produce copious quantities of gases. The amount of charge introduced into the molds may vary somewhat depending upon the degree of cellulation which is desired in the product, though for most purposes the molds will be approximately 1/7 to 1/8 full, the filling being based upon the contents of the two superposed halves.

The molds are passed through an elongated or tunnel-like roller hearth furnace 14 upon supports 15. It contains a system of continuously driven conveyor rollers 16 journaled in bearings 16a upon side rails 16b disposed outside the furnace upon the supports 15. The furnace includes burners indicated as openings 17 in the furnace walls for heating the mixture of pulverized glass and gassing agent to the sintering temperature. The furnace is also provided with an outlet passage 18 through which the molds 10 are adapted to pass. This passage may be closed by a screen 19 of chain links or asbestos cloth designed to swing outwardly to permit the molds to pass and then to swing back into position to close the furnace. The sides of the opening may be preferably screened by means of wings 21 to protect the opening from an excessive inrush of cold air during the transition of the molds.

The rollers of the conveyor system are continuously driven by a sprocket chain 22 trained about the sprocket gear 23 of a combined motor and speed-reducing mechanism 24 shown in Fig. 2.

Figure 4:
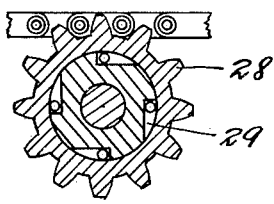
Fig. 4 is a detailed sectional view illustrating an overdrive clutch mechanism for operating the rollers of the conveyor system disclosed in Figs. 1 and 2.
Figure 3:
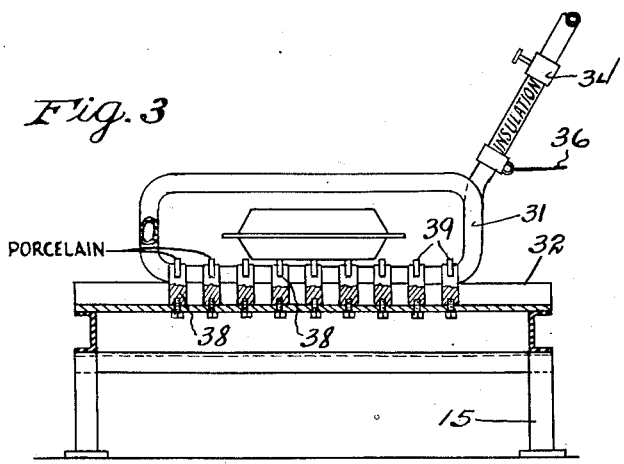
Fig. 3 is a sectional view taken substantially upon the line III—III of Fig. 1.

A section 26 of the conveyor system projects beyond the furnace 14 and the rollers thereof are supported upon a base or platform 27. The rollers in this section preferably are provided with sprocket gears 28, shown in Fig. 4, having pin or overrunning clutches 29, that permit the rollers to be overdriven or run at a speed higher than that of the rollers in the furnace for a purpose to be described later, but providing a slow speed drive for the rollers under normal operating conditions. It will be apparent that the section 26 provides a cooling platform upon which the molds upon emergence from the furnace are adapted preliminarily to cool.

For the purposes of reheating the molds in order to admit of the removal of the contents thereof, induction coil 31 is mounted upon base 32 extending from the base 27 and is so formed as to receive the molds 10 from the section 26. Base 32 may be formed of porcelain or other electrically insulative material. Of course, the coil may also be electrically insulated in any other convenient manner. The coil, as shown, is of copper tubing and preferably is connected at opposite extremities by means of tubular insulators 33a with cooling water conduits 33, which have valves 34 for the control of the circulation of cooling water through the coils. It is to be observed that the extremities of the coil are also connected by electrical conductors 36 to a high frequency generator 37 represented as a conventional transformer. The transformer, of course, would be connected to a suitable source of alternating current not shown. Any convenient mode of generating high frequency current in the coil 31, of course, may be employed. The specific mode does not constitute an element of the present invention. This generator may be of substantially any convenient type, such as is well understood in the art, but preferably it should be capable of attaining at least several thousand cycles per second, e. g., about 300,000 cycles per second is a good value.

The generator should be sufficiently powerful to reheat the molds perhaps as much as two or three hundred degrees in a short time, e. g., 5 to 30 seconds.

It is to be noted that the base 32 carries bearings 38 in which are journaled non-conductive rollers, e. g., undriven porcelain rollers 39 adapted to support the molds while they are in the coil. In the operation of the apparatus the molds on the rollers in the section 26, after they have cooled sufficiently, may be moved manually with tongs or a push-rod along the rollers into the induction coil. This operation requires but slight effort because the overdrive clutches of the rollers in section 26 permit the latter to move quickly upon them and independently of the slow speed chain drive. In the coil the molds glide easily over the rollers 39.

Contiguous to the induction coil 31 is an unloading platform 40, which is provided with conveyor rollers 41, which are also provided with sprockets 42 and are driven by a sprocket chain 43 and at a speed preferably approximating that of the rollers 26. The reheated molds in the coil 31 are drawn out manually upon this platform. Preferably the sprockets are provided with overrunning or pin clutches corresponding to clutches 29 that permit the molds to be drawn quickly upon the unloading section.

By reason of the rapid heating of the molds they are substantially expanded and the surfaces thereof are freed from the cellulated glass contained therein. The latter being a very poor conductor of heat is not substantially expanded and therefore it is an easy matter to remove the mold sections and deposit the resultant cellular cake or block upon the rollers for transfer to an annealing lehr 44. This lehr contains the conveyor system of rollers 46, which in effect are a continuation of the rollers of the system 41, are driven at uniform rate by the sprocket chain 43.

The mixture in the molds 10 will usually be heated to about 1500 or 1600° F. In preliminary cooling on platform 27 the temperature will drop to about 1100° F. Subsequently, the mold will be reheated to about 1300° F. in coil 31. The movement from the cooling section into the coil 31 should be made quickly. Also, the molds should be quickly drawn from the coil and the blocks removed at once.

In Fig. 5 is disclosed a further embodiment of the invention in which an induction coil is employed for heating the mixture of crushed glass and gassing agent in order to obtain cellulation. In this construction a platform 50 is provided with a system 51 of electrically non-conductive conveyor rollers 52, which are driven by a sprocket chain 53, trained about the drive of a combined motor and speed-reducing mechanism 54. Also, mounted upon the platform, is an induction coil 56, which is excited by a high frequency generator 57 connected by conductors 58 to opposite ends thereof. The coils preferably are of copper tubing and are connected to conduits 59 for the circulation of cooling fluid. The rollers carrying the molds through the coil constitute a section 61 and are driven by chain 62, driven in turn by motor 63.

Section 64 of the conveyor system having rollers 64a is exposed to the atmosphere for the purposes of preliminarily cooling the molds. These rollers are driven by chain drive 65 actuated by motor 65a. Contiguous to this section is a section 66, which includes an induction coil 67 for quickly reheating the molds. The molds after reheating in the induction coil are stripped from the cellular blocks or cakes upon the rollers in a zone 68. After the stripping operation the blocks are carried into a lehr 69 for annealing. The latter is provided with conventional conveyor rollers 70 driven by sprocket chain 71.

In the operation of the apparatus described the molds are loaded while they are upon the platform 50 and are carried by the conveyor rollers 52 and 61, which are constantly driven through the coil or coils 56 where they are subjected to the high frequency field from the generator 57. As a result of this field, the molds are quickly heated to a high temperature which is transmitted to the contents. The heating operation is best continued until the contents are heated slightly above the sintering point of the glass, but below that at which the mass is completely melted down into a fluid state.

In the heating operation, the particles of glass are sintered together at their points of contact and the gassing agent releases its gas to form bubbles. The molds with the pasty or bloated coherent bodies are conducted to the zone 64 where they are cooled down sufficiently to solidify at least the outer crusts of the contents and are then carried into the coil 67 where the molds are again quickly elevated to a relatively high temperature without substantially heating the contents. As a result the molds are expanded and freed from the glass so that they can be readily removed on the section 68. The molds are returned for reheating and the cellular blocks are conducted through the annealing lehr 69 where they are cooled very gradually in order to relieve internal stresses in the glass.

The forms of the invention herein shown and described are to be considered merely as exemplary. It will be apparent to those skilled in the art that numerous modifications may be made therein without departure from the spirit of the invention or the scope of the appended claims.

What I claim is:

1. In the process of forming a cellular glass body by sintering finely crushed glass and a gassing agent adapted to liberate gases at the sintering temperature of the glass in a mold comprising two halves of bread-pan like section, one being inverted over the other to provide the mold chamber, the steps of suddenly partially cooling the mold after the sintering operation exposing the mold to a high frequency field quickly to heat it and to free the cellulated body from the mold surfaces and removing the body from the mold.

2. In the process of forming a cellular glass body by sintering finely crushed glass and a gassing agent adapted to liberate gases at the sintering temperature of the mass in a mold comprising a bread pan-like bottom portion and a cover portion therefor providing a mold chamber, the steps of suddenly partially cooling the mold after the sintering operation, exposing the mold to a high frequency field quickly to heat it and to free the cellulated body from the mold surface and removing the body from the mold.

WILLIAM OWEN.